(12) United States Patent
Ribbeck et al.

(10) Patent No.: US 8,454,275 B2
(45) Date of Patent: Jun. 4, 2013

(54) BEVEL GEAR CUTTING TOOL WITH CUTTER BARS

(75) Inventors: Karl-Martin Ribbeck, Remscheid (DE); Thomas Reiter, Wipperfürth (DE)

(73) Assignee: Klingelnberg AG, Zürich (CH)

( * ) Notice: Subject to any disclaimer, the term of this patent is extended or adjusted under 35 U.S.C. 154(b) by 789 days.

(21) Appl. No.: 12/599,528

(22) PCT Filed: Apr. 23, 2008

(86) PCT No.: PCT/EP2008/054926
§ 371 (c)(1),
(2), (4) Date: Dec. 31, 2009

(87) PCT Pub. No.: WO2008/138718
PCT Pub. Date: Nov. 20, 2008

(65) Prior Publication Data
US 2010/0196107 A1 Aug. 5, 2010

(30) Foreign Application Priority Data

May 16, 2007 (DE) .................. 20 2007 007 063 U

(51) Int. Cl.
*B23C 5/12* (2006.01)
*B23F 21/166* (2006.01)

(52) U.S. Cl.
USPC ............................................. 407/25; 407/52

(58) Field of Classification Search
USPC .......................................... 407/23, 25, 31, 52
See application file for complete search history.

(56) References Cited

U.S. PATENT DOCUMENTS

| 1,495,067 | A | * | 5/1924 | Conklin | 407/25 |
| 1,667,299 | A | * | 4/1928 | Wildhaber | 407/21 |
| 4,218,159 | A | * | 8/1980 | Langen | 407/25 |
| 4,464,086 | A | * | 8/1984 | Bentjens | 407/25 |
| 4,536,106 | A | * | 8/1985 | Zorn | 407/25 |
| 5,123,786 | A | * | 6/1992 | Yates et al. | 407/38 |
| 2007/0011855 | A1 | | 1/2007 | Ribbeck | |

FOREIGN PATENT DOCUMENTS

| DE | 200 16 673 U1 | 12/2000 |
| DE | 20 2004 007 624 U1 | 10/2004 |
| DE | 20 2007 007 063 U1 | 10/2007 |
| EP | 0 151 107 A1 | 8/1985 |
| GB | 1297358 | 11/1972 |
| WO | 03/089203 A1 | 10/2003 |

OTHER PUBLICATIONS

International Preliminary Report on Patentability for International Application No. PCT/EP2008/054926 dated Nov. 17, 2009.
International Search Report for PCT/EP2008/054926.

\* cited by examiner

*Primary Examiner* — Will Fridie, Jr.
(74) *Attorney, Agent, or Firm* — McCormick, Paulding & Huber LLP

(57) ABSTRACT

The invention relates to a form blade (10) for the milling of bevel gears, with a base body (11) which has a receiving area and with at least two cutting strips (13.1, 13.2) with a cutting edge (18.1). The cutting strips (13.1, 13.2) are detachably fixed in corresponding receiving areas (12.1, 12.2) of the base body (11).

13 Claims, 12 Drawing Sheets

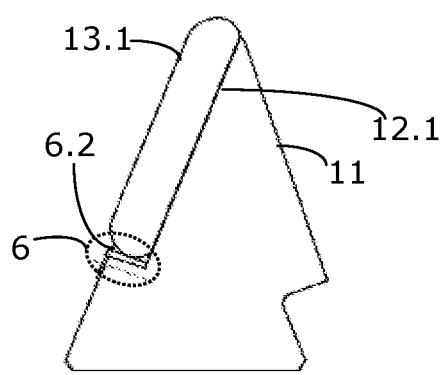
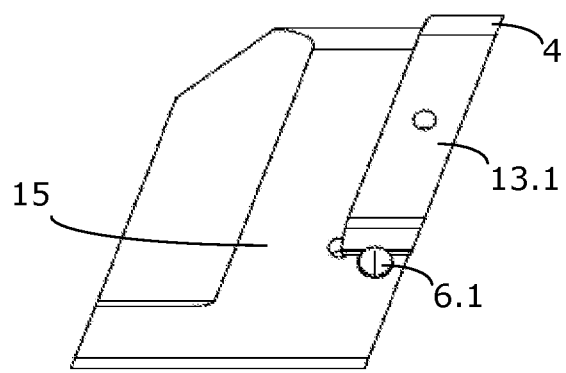
Fig. 5A   Fig. 5B
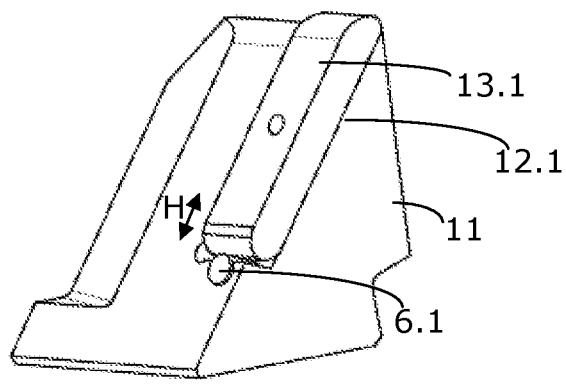
Fig. 5C

BEVEL GEAR CUTTING TOOL WITH CUTTER BARS

CROSS REFERENCE TO RELATED APPLICATIONS

The priority of the German utility model deposition DE 20 2007 007 063.2 is claimed, which was deposited on 16 May 2007 under the title "KEGELRADFRÄSWERKZEUG MIT FRÄSSCHNEIDPLATTEN" (BEVEL GEAR CUTTING TOOL WITH CUTTER BARS).

FIELD OF THE INVENTION

The invention relates to bevel gear cutting tools (bevel gear milling tools) for milling bevel gearings and the use of such tools in soft- and hard gear cutting.

Background of the Invention

There are various tools for machining bevel gears. Machining with so-called face mill cutters is currently especially preferred which are equipped with a number of bar cutting blades. These bar cutting blades protrude in the axial direction of the face mill cutter and are arranged and aligned in such a way that the flanks of the tooth gaps of a bevel gear are machined. Typically, only one of the flanks of a tooth gap is cut with each bar cutting blade.

In the case of the so-called TWIN Blade™ of Klingelnberg GmbH, Germany, a bar cutting blade comprises two equivalent cutting edges which simultaneously machine the concave and convex flanks of a tooth gap.

Alternatively, cutter heads with so-called form blades are also used today. These form blades have a different shape than the bar cutters and are only reground on the breast. It is an advantage of bevel gear milling with form blades that no special grinding machine is required for regrinding the blades. The known Zyklo-Palloid method uses such form blades for example for producing spiral bevel gears.

The form blades are typically made of high-speed steel (HSS material) or hard metal (HM). The hard-metal form blades come with the disadvantage however that they are impact-sensitive. When the hard-metal form blades are used for producing large-module bevel gears, the form blades will be respectively large, heavy and especially expensive.

The invention is therefore based on the object of providing a tool for the cutting, especially the milling, of large-module bevel gears which is more cost-effective than known solutions.

It is further object of the invention to reduce the time needed for dismounting, regrinding and re-mounting the form blades.

These objects are achieved in accordance with the invention.

The objects are achieved according to the invention in such a way that a cutter head is used which carries several novel base holders with several cutter bars instead of the single-piece bar or form blades. In accordance with the invention, these cutter bars are arranged in the region of the clearance face, i.e. they extend to the side of the base holder.

The cutter bars are preferably made of hard metal or CBN-plated metal (cubic crystal boron nitride).

It is an advantage of the tools in accordance with the invention that they are considerably cheaper than previous tools made of hard metal. Moreover, they nevertheless offer high precision and long tool life.

It is an advantage of the tools in accordance with the invention that the cutter bars can be used several times without requiring any regrinding. The cutter bars are reversed for this purpose in order to be fastened again in the base holder.

Further advantageous embodiments are described.

BRIEF DESCRIPTION OF THE DRAWINGS

Embodiments of the invention are described in the following in detail making reference to the drawings.

FIG. 5A is a schematic front view of a further form blade with a cutter bar;

FIG. 5B is a schematic side view of the further form blade according to FIG. 5A;

FIG. 5C is a perspective view of the further form blade according to FIG. 5A;

DESCRIPTION OF THE PREFERRED EMBODIMENTS

Terms are used in connection with the present description which are also used in relevant publications and patents. Notice shall be taken however that the use of such terms shall merely be for better understanding. The inventive idea and the scope of protection of the claims shall not be limited in their interpretation by the specific use of the terms. The invention can be applied easily to other systems of terms and/or specialist fields. Terms shall be applied analogously in other specialist fields.

Figure 1:
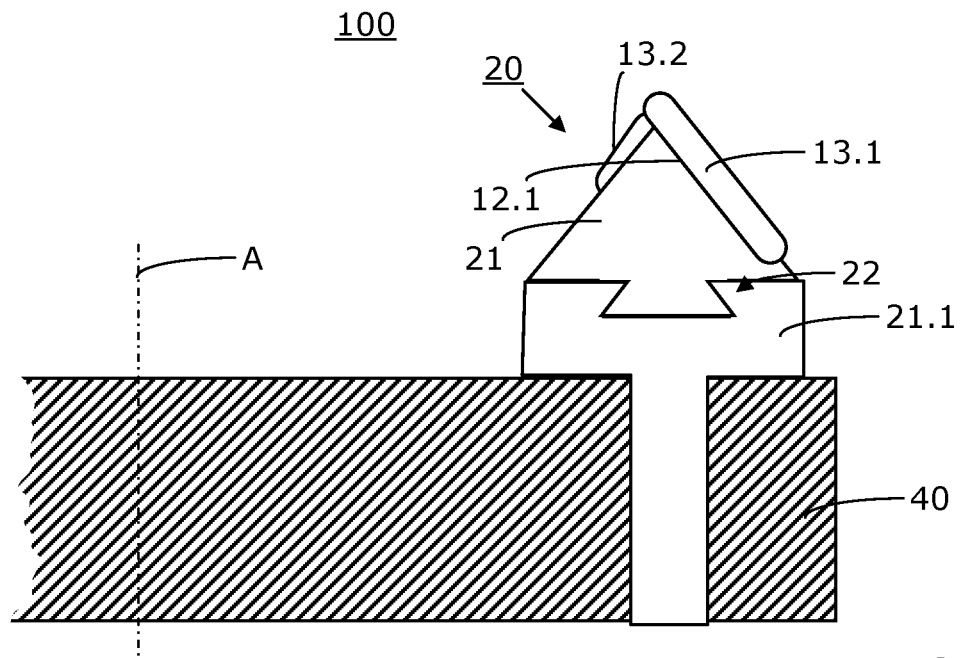
FIG. 1 is a schematic sectional view of a first tool for hard machining, in accordance with the invention.

The first embodiment of the invention is shown in FIG. 1. FIG. 1 shows a schematic sectional view of a first machine tool 100, which is preferably used for hard machining, in accordance with the invention. The tool 100 is shown for machining tooth gaps on a workpiece. The machine tool 100 comprises a cutter head 40 which is only shown schematically in FIG. 1. The cutter head 40 comprises a tool spindle axis A about which the tool 100 rotates. The cutter head 40 carries several groups of forming tools along its circumference. Each group of tools comprises two form blades 20 in this case. FIG. 1 shows only one such form blade 20. Each form blade 20 comprises a base body 21 which is equipped or provided with a clamping body 21.1 for mounting in the cutter head 40. The clamping body 21.1 allows a variable positioning in the tangential direction and tightly clamping the base body 21, e.g. by means of clamping screws or by means of a dovetail clamping system 22, as shown in FIG. 1.

The cutter head 40 can be carried out identically for soft and hard machining. The form blades 10 or 20 are preferably adjusted to the respective machining form. In soft machining, hard-metal cutter bars 13.1 to 13.3 are preferably used in accordance with the invention whose cutting edges cannot be reground. The time that was required up until now for dismounting, regrinding and renewed mounting the form blades can be avoided in accordance with the invention.

CBN-plated cutter bars 13.1 to 13.3 are preferably used in hard machining in accordance with the invention. They can be reground.

Furthermore, a first receiving area 12.1 is provided for a first cutting body. Said first cutting body is a cutter bar 13.1 which is designated here as the first cutter bar.

Figure 11:
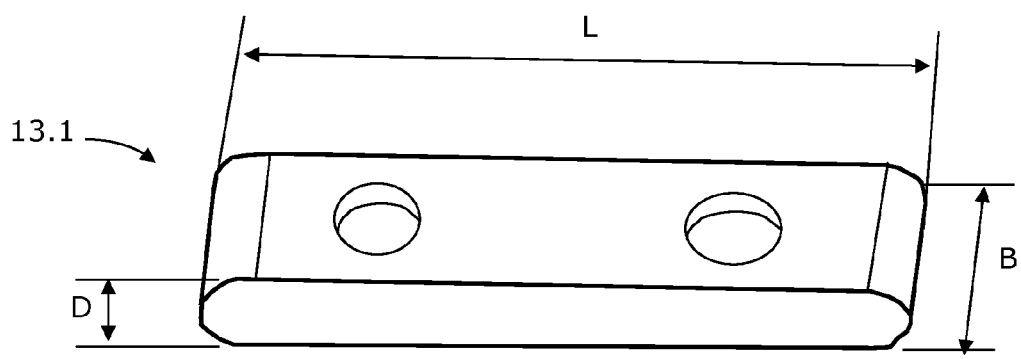
FIG. 11 is a perspective view of a cutter bar in accordance with the invention.

The term cutter bar is used in the present patent application in order to describe an oblong flat cutting body. A cutter bar 13.1 in accordance with the invention typically has a length L which is larger than the width B and thickness D, as shown in FIG. 11. This means that the following relation applies: $L \gg B$ and $L \gg D$, with $B > D$ occurring frequently. Cutter bars 13.1 are especially preferred whose dimensions fall into the following grid: ratio of L/B between 1.5 and 5, preferably between 1.7 and 4.7; ratio of L/HG between 4 and 10, preferably between 5 and 7. In addition, the ratio B/H can be between 1.2 and 3, preferably between 1.25 and 2.9. These details on the ratio of B/H are optional. The dimensions of the cutter bars 13.2 differ from those of cutter bars 13.1. The thickness D and width B are typically identical with the width B and thickness D of the cutter bars 13.1, but the length is slightly shorter. Cutter bars 13.2 are especially preferred whose length L between 1.1 and 1.5 is shorter than the length of the cutter bars 13.1.

Such cutter bars 13.1, 13.2 are used in all embodiments.

Figure 12A:
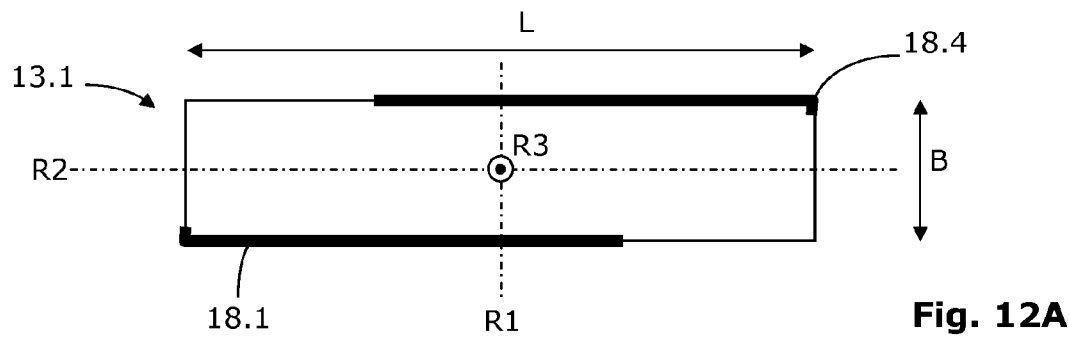
FIG. 12A is a schematic top view of a cutter bar in accordance with the invention with a rectangular basic shape with the front side facing upwardly.
Figure 12B:
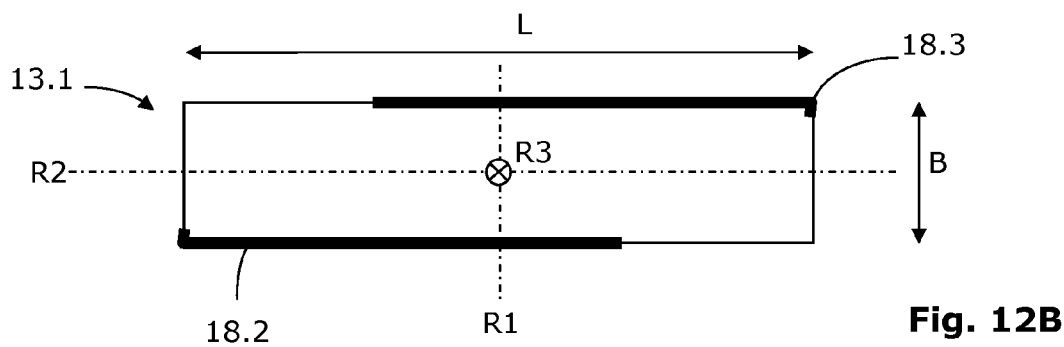
FIG. 12B is a schematic top view of the cutter bar in accordance with the invention according to FIG. 12A with the rear side facing upwardly.
Figure 12C:
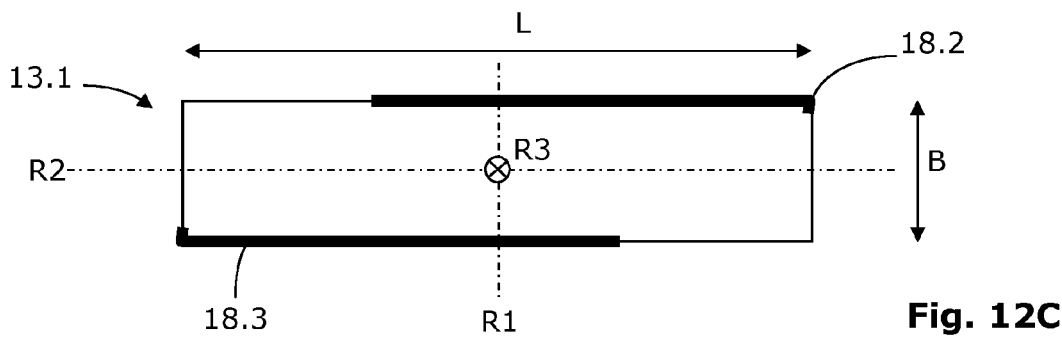
FIG. 12C is a schematic top view of the cutter bar in accordance with the invention according to FIG. 12A with the rear side facing upwardly and turned about the axis R3.
Figure 12D:
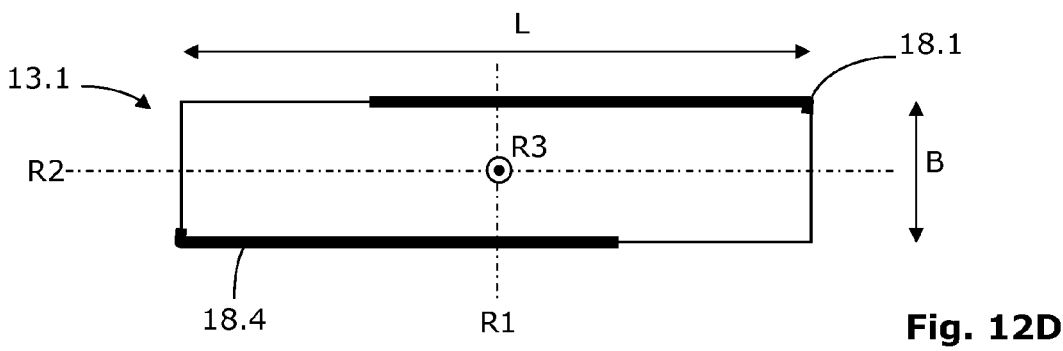
FIG. 12D is a schematic top view of the cutter bar in accordance with the invention according to FIG. 12A with the front side facing upwardly and turned about the axis R3.
Figure 13A:
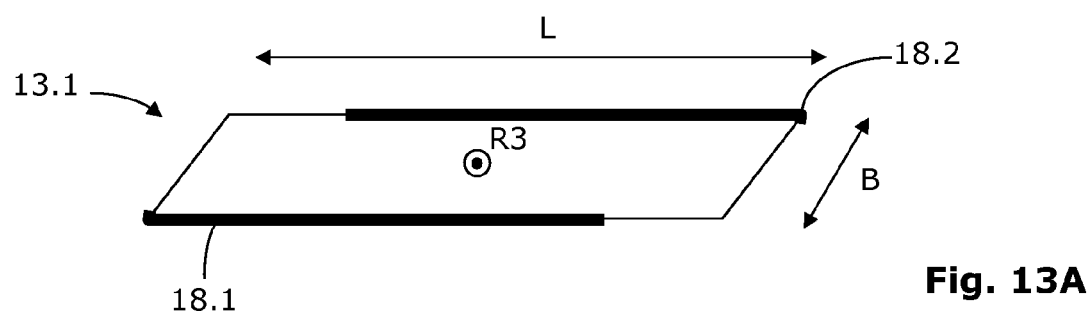
FIG. 13A is a schematic top view of a cutter bar in accordance with the invention with a rhombic base shape with the front side facing upwardly.
Figure 13B:
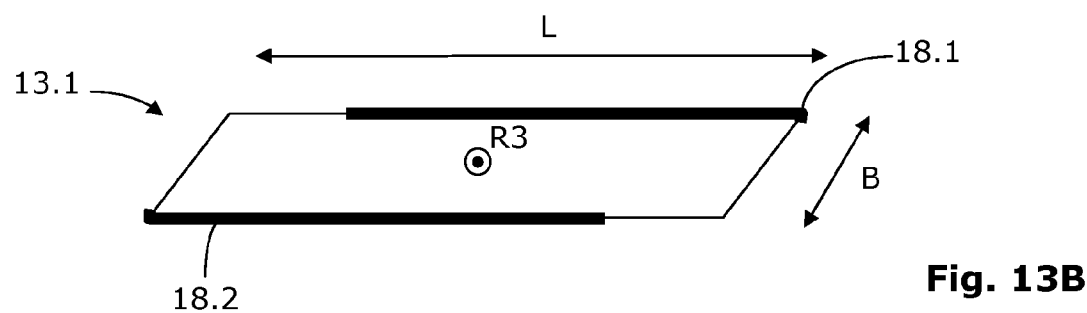
FIG. 13B is a schematic top view of the cutter bar in accordance with the invention according to FIG. 13A with the front side facing upwardly and turned about the axis R3.

A cutter bar 13.1 in accordance with the invention preferably has a rectangular or almost rectangular shape in the top view, with the respective rectangle being defined by the edges with the lengths L and B, as indicated in FIGS. 12A to 12D. A cutter bar in accordance with the invention can also have a rhombic shape, with the side edges of the rhombus being defined by the lengths L and B, as indicated in FIGS. 13A to 13B.

Cutter bars 13.1, 13.2 and 13.3 are especially preferred which are arranged in such a way that they each have four cutting edges. A rectangular cutter bar 13.1 with four cutting edges 18.1 to 18.4 is shown in the FIGS. 12A to 12D. The cutter bar 13.1 can be turned about three axes R1, R2 and R3. Other cutting edges are used by rotation about these axes. In FIG. 12A, the cutting edge 18.1 is aligned in such a way that this cutting edge 18.1 will cut. When cutter bar 13.1 is detached from the base body 11 and is turned about the axis R1, cutting edge 18.2 is used, as is shown in FIG. 12B. The cutting edge 18.2 is disposed diagonally opposite of the cutting edge 18.1 on the rear side of cutter bar 13.1. When cutter bar 13.1 is detached from the base body 11 and is rotated about the axis R3, the cutting edge 18.3 is used, as shown in FIG. 12C. The cutting edge 18.3 lies together with the cutting edge 18.2 on the rear side of the cutter bar 13.1. When cutter bar 13.1 is detached from the base body 11 and is rotated about the axis R2, the cutting edge 18.4 is used, as shown in FIG. 12D. The cutting edge 18.4 lies together with the cutting edge 18.1 on the front side of the cutter bar 13.1.

Cutter bars 13.1 are also suitable which are configured in such a way that they have two cutting edges each. FIGS. 13A and 13B show a rhombic cutter bar 13.1 with two cutting edges 18.1 and 18.2. The cutter bar 13.1 can be rotated about an axis R3. In FIG. 13A, the cutting edge 18.1 is aligned in such a way that this cutting edge 18.1 will cut. When the cutter bar 13.1 is detached from the base body 11 and is rotated about the axis R3, cutting edge 18.2 is used, as shown in FIG. 13B. The cutting edge 18.2 is disposed diagonally opposite of the cutting edge 18.1 on the same side (front side) of the cutter bar 13.1 as the cutting edge 18.1.

Such cutter bars with two or more cutting edges are used in all embodiments.

Figure 7A:
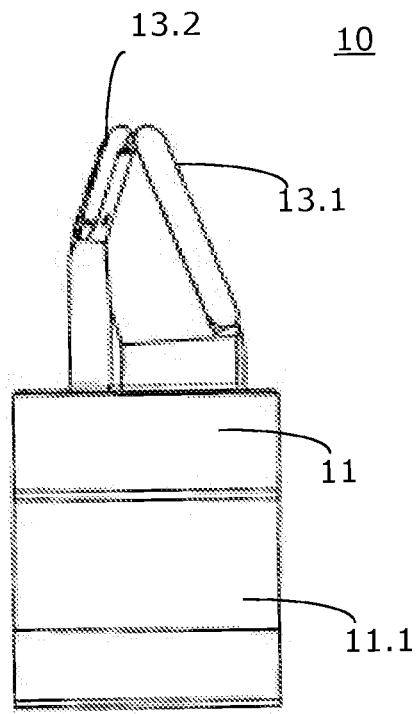
FIG. 7A is a schematic front view of a third form blade with two cutter bars in accordance with the invention.
Figure 7B:
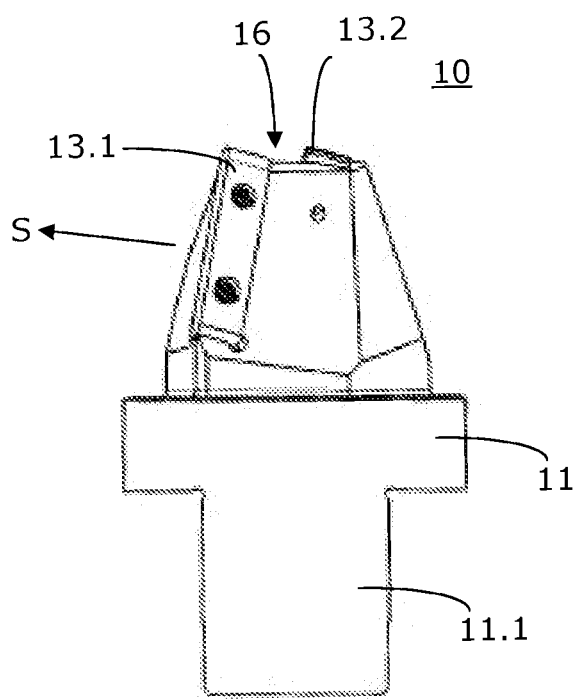
FIG. 7B is a schematic side view of the third form blade in accordance with the invention according to FIG. 7A.
Figure 7C:
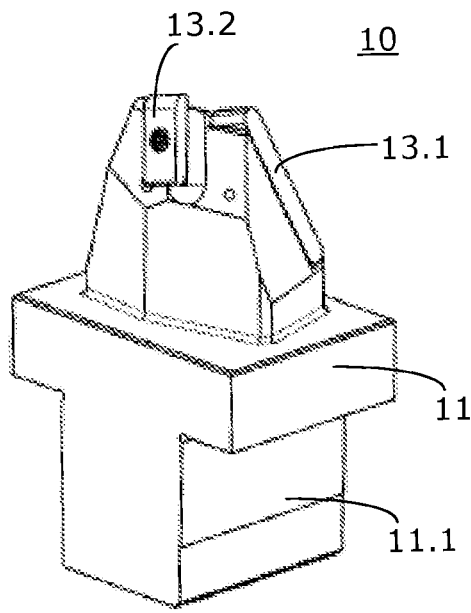
FIG. 7C is a perspective view of the third form blade in accordance with the invention according to FIG. 7A.
Figure 10:
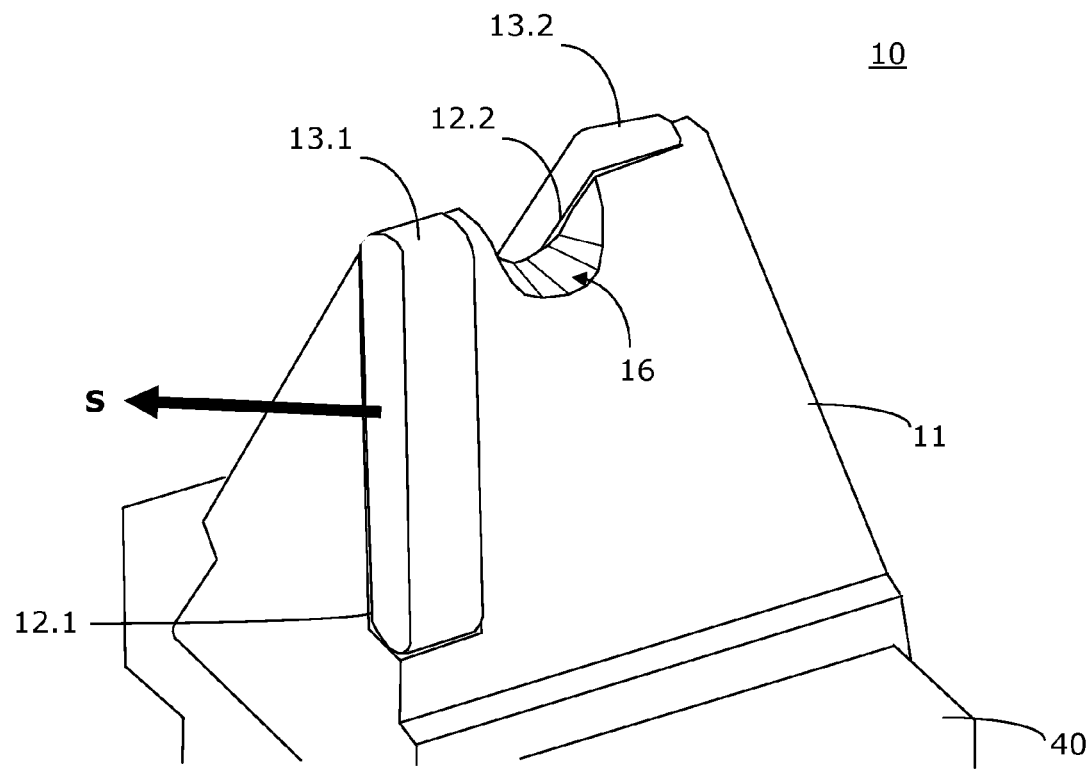
FIG. 10 is a perspective view of a fourth form blade in accordance with the invention.

The tool 100 in accordance with the invention further comprises a second receiving area 12.2 (see FIG. 4A for example) on the base body 21. Said second receiving area 12.2 is arranged for receiving a second cutter bar 13.2. In accordance with the invention, the first receiving area 12.1 and the second receiving area 12.2 are arranged in a spatially offset manner on the base body 21. The spatial offset defines the thickness and size of the chips which are produced during machining. The size of the chip space 16 can be arranged accordingly (such a chip space 16 is shown in FIG. 7B or FIG. 10 for example).

Spatially offset means that, when seen in the cutting direction S (see FIG. 7B for example), the first cutter bar 13.1 is arranged on the base body 11 before the second cutter bar 13.2. The first cutter bar 13.1 is preferably longer (L is longer) than the second cutter bar 13.2, with the first cutter bar 13.1 providing a main cutting blade 18.1, whereas the second cutter bar 13.2 provides a secondary cutting blade (18.5) (see FIG. 7E for example).

The term base body 11, 21 shall be used in the present patent application in order to define a support body for the cutter bars 13.1-13.4. Preferably, the base body 11, 21 has a pyramidal or pointed shape. Such base bodies 11, 21 are used in all embodiments.

Figure 2:
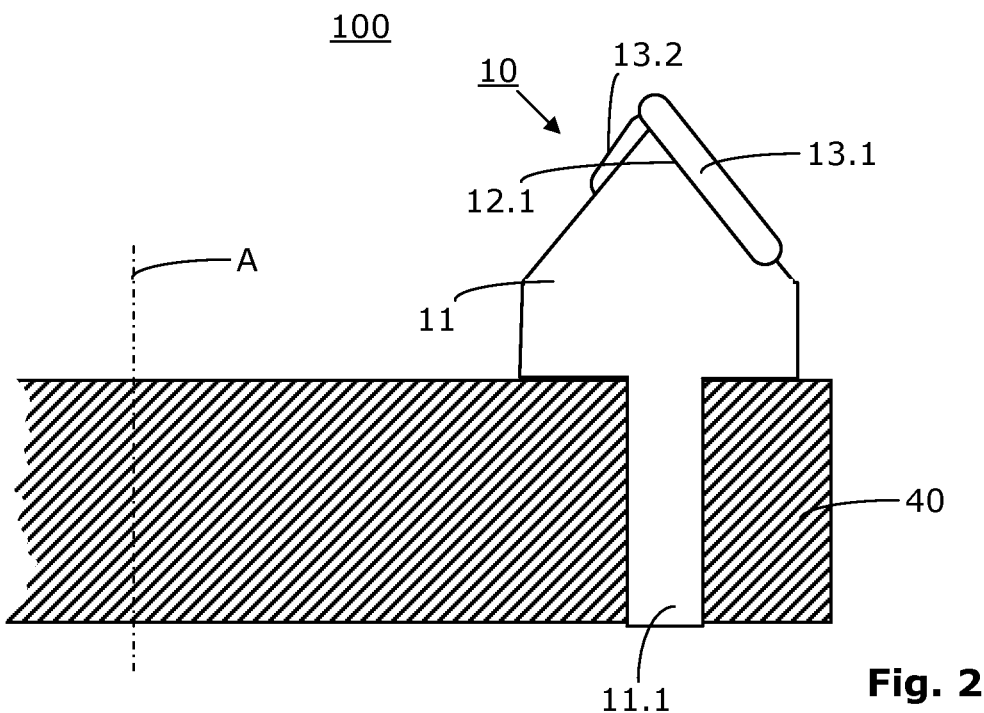
FIG. 2 is a schematic sectional view of a second tool for soft machining, in accordance with the invention.

A second embodiment of the invention is shown in FIG. 2. FIG. 2 shows a schematic sectional view of a second tool 100 which can preferably be used for soft machining, in accordance with the invention. A tool 100 is shown for machining tooth gaps in a workpiece which was not yet hardened. The tool 100 comprises a cutter head 40 which is only schematically indicated in FIG. 2. The cutter head 40 comprises a tool spindle axis A about which the tool 100 rotates. The cutter head 40 comprises several groups of tools along its circumference. Each group of tools comprises two form blades 10 in this case. FIG. 2 shows only one such form blade 10. Each form blade 10 comprises a base body 11 which is provided with a connecting area 11.1 for insertion into the cutter head 40. The connecting area 11.1 is preferably an integral component of the base body 11. The connecting area 11.1 can also be screwed, welded or fastened in any other way to the base body 11.

Figure 7D:
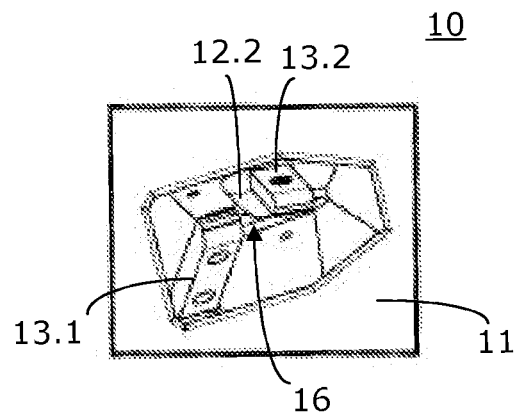
FIG. 7D is a top view of the third form blade in accordance with the invention according to FIG. 7A.

Furthermore, a first receiving area 12.1 for a first cutting body is provided. Said first cutting body is a cutter bar 13.1 which is designated here as the first cutter bar. The tool 100 in accordance with the invention further comprises a second receiving area 12.2 (see FIG. 7D for example) on the base body 11. Said second receiving area 12.2 is arranged for receiving a second cutter bar 13.2. In accordance with the invention, the first receiving area 12.1 and the second receiving area 12.2 are arranged on the base body 11 in a spatially offset manner with respect to one another.

Figure 3A:
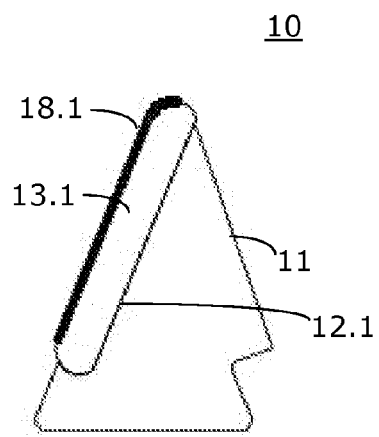
FIG. 3A is a schematic front view of a form blade with a cutter bar.
Figure 3B:
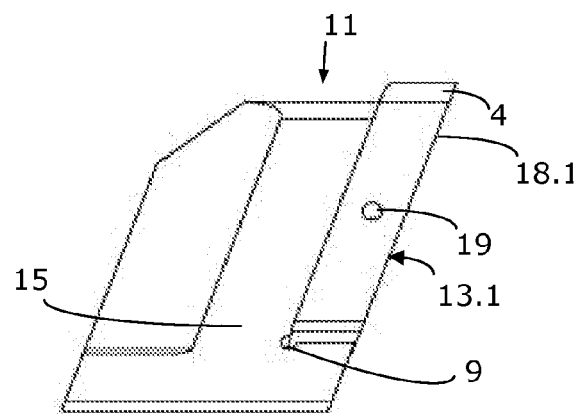
FIG. 3B is a schematic side view of the form blade according to FIG. 3A.
Figure 3C:
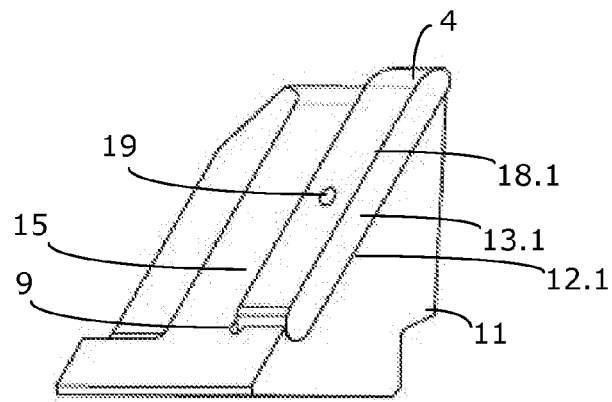
FIG. 3C is a perspective view of the form blade according to FIG. 3A.

An embodiment is especially preferred in which a cavity used as chip space 16 is provided on the base body 11, 21. Details of such an especially preferred embodiment are shown in FIG. 10. Such a chip space 16 can be provided in all embodiments and offers the advantage that the metal chips can be removed easily without causing any overheating of the tool 100. The cavity was chosen in order to define an inwardly facing recess, hollow or notch.

form blade 10 with a cutter bar 13.1 is shown in FIGS. 3A to 3C. FIG. 3A shows the front view, FIG. 3B a side view from the left and FIG. 3C shows a general view of the form blade 10. The form blade 10 comprises a base body 11 (plate holder 1) which is arranged in the illustrated embodiment for receiving a cutter bar 13.1. The base body 11 and the cutter bar 2 are used jointly as a substitute for a conventional form blade and are therefore also designated here accordingly as form blades 10. Two cutting edges are provided on the form blade 10, which are the primary cutter and a secondary cutter which is usually designated as head cutter. In FIG. 3A, these cutters are designated with reference numeral 18.1 and are indicated schematically by a thick line.

This cutter bar 13.1 is arranged in the region of the relief face 15 of the base body 11, i.e. it extends to the side of the base body 11.

The cutter bar 13.1 is made of hard metal and comprises a ground cutting edge 18.1 which extends along a longitudinal side up to a head region 4. The cutting edge 13.1 preferably comprises a ground-in protuberance for end machining a large-module bevel gear. The edge length of the cutting edge 18.1 is suitable for various module sizes, which means the cutter bar 13.1 can be used for the gearing of bevel gears of different modules.

Figure 4A:
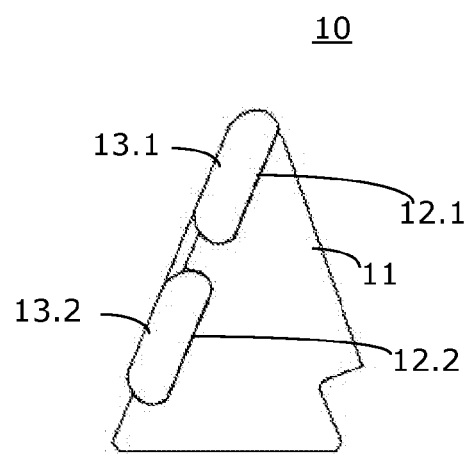
FIG. 4A is a schematic front view of a first form blade in accordance with the invention with three cutter bars.
Figure 4B:
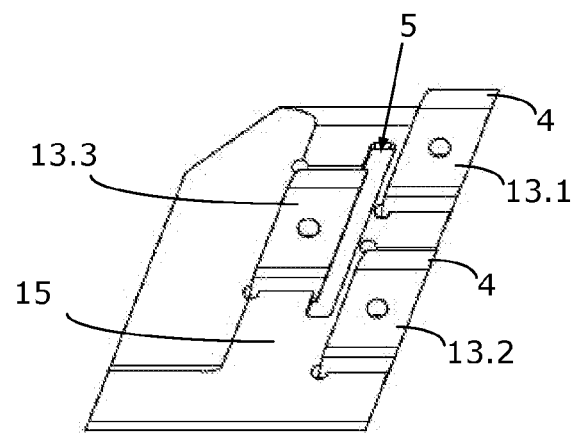
FIG. 4B is a schematic side view of the first form blade in accordance with the invention.
Figure 4C:
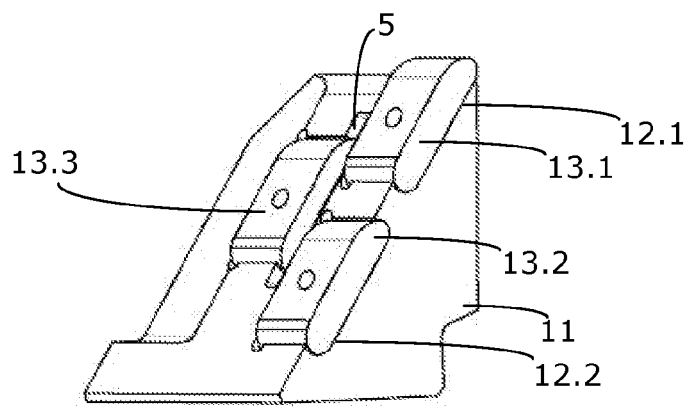
FIG. 4C is a schematic front view of a further form blade with a cutter bar.

A first embodiment of the invention in accordance with the invention is shown in FIGS. 4A to 4C. FIG. 4A shows the front view, FIG. 4B a side view from the left and FIG. 4C a general view of a novel form blade 10. The form blade 10 comprises a base body 11 which is designed in the illustrated example for receiving three cutter bars 13.1, 13.2 and 13.3.

As a result of the special kind of the arrangement of the cutter bars 13.1, 13.2 and 13.3, a so-called cutting division occurs during the milling of the tooth gaps of a bevel gear. This cutting division is obtained in such a way for example that one of the cutter bars 13.1 provides a primary cutter 18.1, whereas a second cutter bar 13.2 provides a secondary cutter 18.5.

This embodiment is especially suitable for roughing-down work on large-module bevel gears.

Hard-metal cutter bars 13.1, 13.2 and 13.3 in sintered configuration are especially preferred in this embodiment because they are inexpensive.

The cutter bars 13.1, 13.2 and 13.3 are preferably designed in such a way that they each comprise four cutting edges, as described in connection with the FIGS. 12A to 12D. The rear cutter bar 13.3 must have tangential adjustability in order to bridge different pitch circle radii. The respectively pitch circle radius is obtained from the distance of the cutter bar 13.1, 13.2, 13.3 with respect to axis A of the cutter head 40. The tangential adjustability is achieved in the illustrated embodiment in such a way that a longitudinal groove 5 is provided in the base body 11, as is shown in FIGS. 4B and 4C.

A further form blade 10 is shown in the FIGS. 5A to 5C. FIG. 5A shows the front view, FIG. 5B shows a side view from the left and FIG. 5C shows a general view of the form blade 10. The form blade 10 comprises a base body 11 which is arranged in the illustrated example for receiving a cutter bar 13.1. In contrast to the form blades 10 shown in the FIGS. 3A to 3C and 4A to 4C, an eccentric element 6 is used here which is arranged in a region beneath the cutter bar 13.1.

As is shown in FIG. 5B, the eccentric element 6 can comprise a screw 6.1. An eccentric arm 6.2 (see FIG. 5A) can be moved by turning this screw 6.1. Said eccentric arm 6.2 is in interaction with the bottom end of the cutter bar 13.1 and can displace the same in its height position, as is indicated in FIG. 5C by a double arrow H.

This form blade 10 is especially suitable for roughing and finishing work because simple adjustability is given by the possibility of height adjustment via the eccentric element 6. The eccentric element 6 can be used in all other embodiments analogously. Either one of the cutter bars 13.1, 13.2, 13.3 comprises several eccentric elements 6 or all cutter bars 13.1, 13.2, 13.3 comprise one eccentric element 6 for individual height adjustability.

Figure 6A:
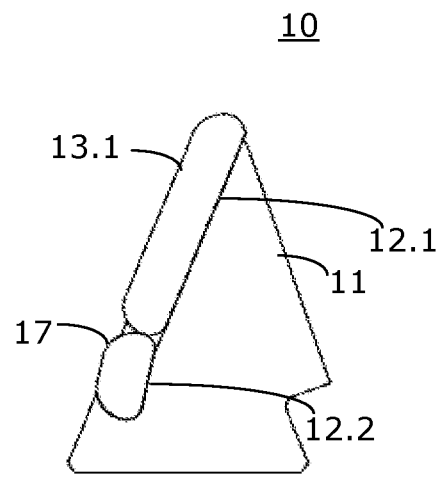
FIG. 6A is a schematic front view of a second form blade with two cutter bars in accordance with the invention.
Figure 6B:
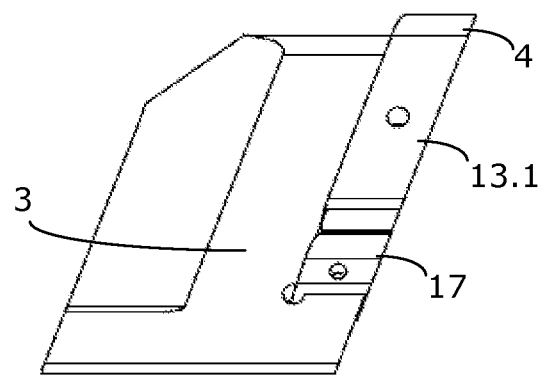
FIG. 6B is a schematic side view of the further form blade in accordance with the invention according to FIG. 6A.
Figure 6C:
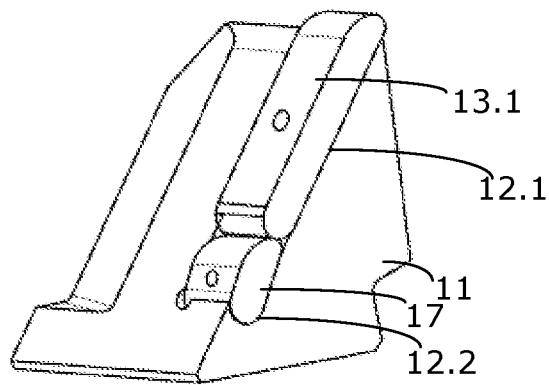
FIG. 6C is a perspective view of the further form blade in accordance with the invention according to FIG. 6A.

A further embodiment of the invention is shown in the FIGS. 6A to 6C. FIG. 6A shows the front view, FIG. 6B shows a side view from the left and FIG. 6C shows a general view of the novel form blade 10. The form blade 10 comprises a base body 11 which in the illustrated example is arranged to receive a cutter bar 13.1. In contrast to the other embodiments, a support plate 17 is used here which is arranged in a region beneath the cutter bar 13.1. This support plate 17 comes with the advantage that it is more stable than the eccentric element 6.

This embodiment is also especially suitable for roughing and finishing work because simple adjustability of the position of the cutter bar 13.1 is given by the possibility of height adjustment via the support plate 17. A support plate 17 can be used in all other embodiments analogously.

In addition to mere support function, the support plate 17 can also have a cutting edge. If the support plate 17 comprises a cutting edge, there is also a cutting division between the cutter bar 13.1 and the support plate 17 in the embodiment as shown in the FIGS. 6A to 6C.

Embodiments of the invention are especially preferred in which the cutter bar(s) 13.1, 13.2, 13.3 are clamped tangentially on the base body 11 (tangentially corresponding in this case approximately to the direction of the cutting speed; in other words, the tangential direction corresponds here to the tangent on the tool diameter or cutter head diameter). This tangential clamping is very stable because the cutter bar(s) 13.1, 13.2, 13.3 are pressed during cutting into the respective receiving area 12.1, 12.2, 12.3.

Moreover, the tangential clamping on the free surface 3 of base body 11 leads to a large contact surface of the cutter bar(s) 13.1, 13.2, 13.3 in the respective receiving area 12.1, 12.2, 12.3. Forces which occur during bevel gear milling can be better introduced and distributed into the base body 11 as a result of the large contact surface.

The cutter bar(s) 13.1, 13.2, 13.3 are preferably fastened with screws onto the base body 11. FIGS. 3B and 3C shows the respective screw holes with reference numeral 19. FIGS. 4B, 4C, 5B, 5C, 6B, 6C, 7B, 7C, 7D, 7E and 11 show analogous screw holes. They are not shown with reference numerals for reasons of better clarity of the illustration.

FIGS. 7A to 7E show an especially preferred embodiment which is arranged especially for soft machining. Every form blade 10 which is to be inserted in a cutter head 40 comprises a base body 11 with a connecting area 11.1 for insertion in the cutter head 40 (also see FIG. 2). A first cutter bar 13.1 which is used as a first cutting body is fastened to the base body 11. A second receiving area 12.2 on the base body 11 is used for receiving and fastening a second cutter bar 13.2. A cavity which is used as a chip space 16 is preferably provided between the two cutter bars 13.1, 13.2. In the illustrated embodiment, the cavity used as a chip space 16 is obtained in such a way that the two cutter bars 13.1, 13.2 protrude with their upper end slightly beyond the region of the base body 11. An intermediate space which is used as a chip space 16 is thus obtained between the protruding cutter bars 13.1, 13.2. The chip space 16 can also (or additionally) be formed in such a way that a recess is provided in the base body (i.e. in the material of the base body 11) (see FIG. 10 for example).

The receiving areas for the cutter bars 13.1, 13.2, 13.3 are positioned on the base body 11 in such a way that the first cutter bar 13.1 and the second cutter bar 13.2 are arranged in a spatially offset manner and the chip space 16 is disposed in a region between the first cutter bar 13.1 and the second cutter bar 13.2.

Figure 7E:
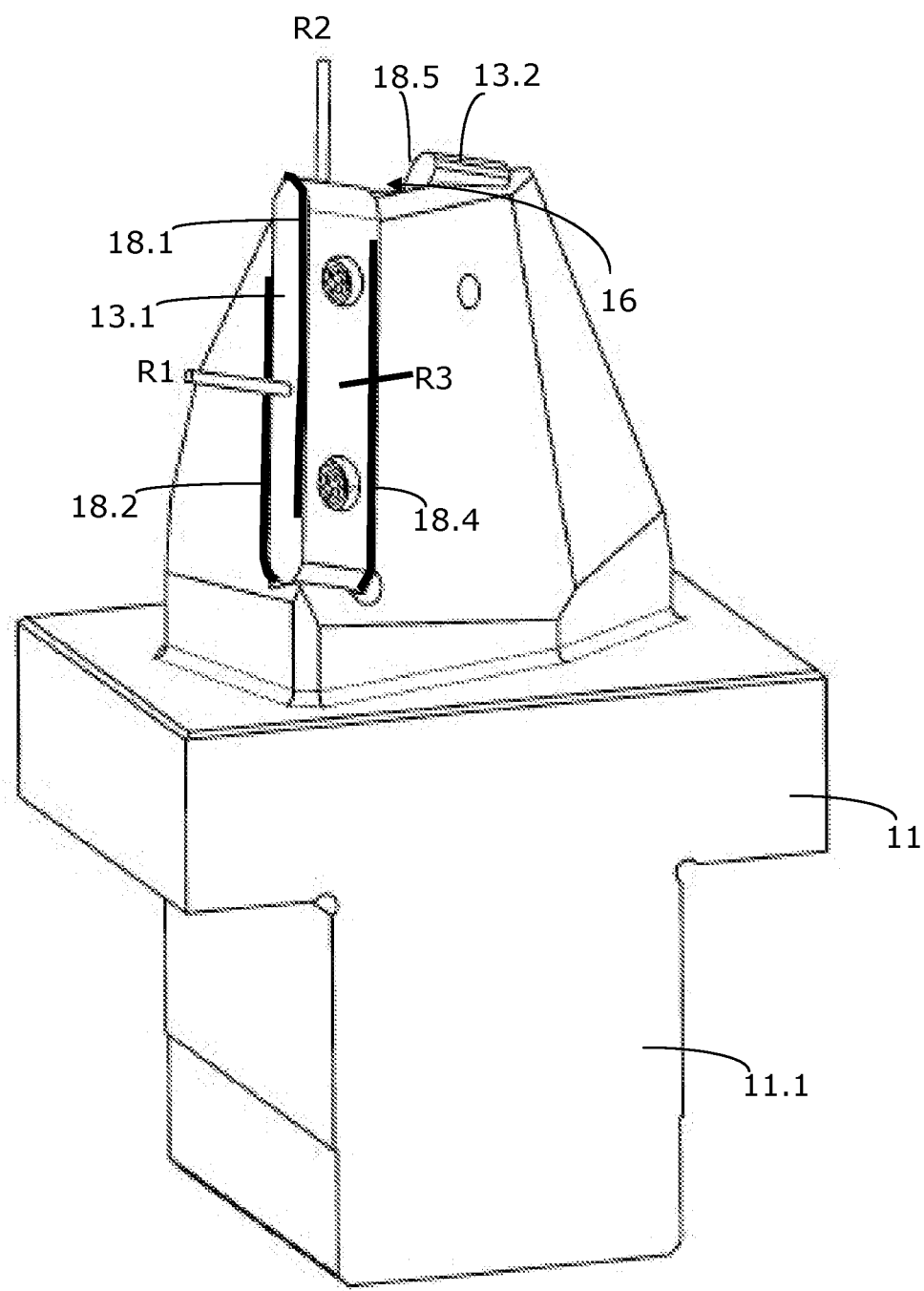
FIG. 7E is a further perspective view of the third form blade in accordance with the invention according to FIG. 7A.

Axes R1, R2 and R3 are indicated in FIG. 7E. The cutter bar 13.1 can be turned or folded about these axes in order to make use of the respective other cutting edges 18.1, 18.2, 18.3 or 18.4. The cutting edge 18.3 is not shown in FIG. 7E because it lies on the reverse side. The cutting edges 18.1, 18.2 and 18.4 are schematically indicated by thick black lines. The axis R1 coincides approximately with the cutting direction S.

Figure 8A:
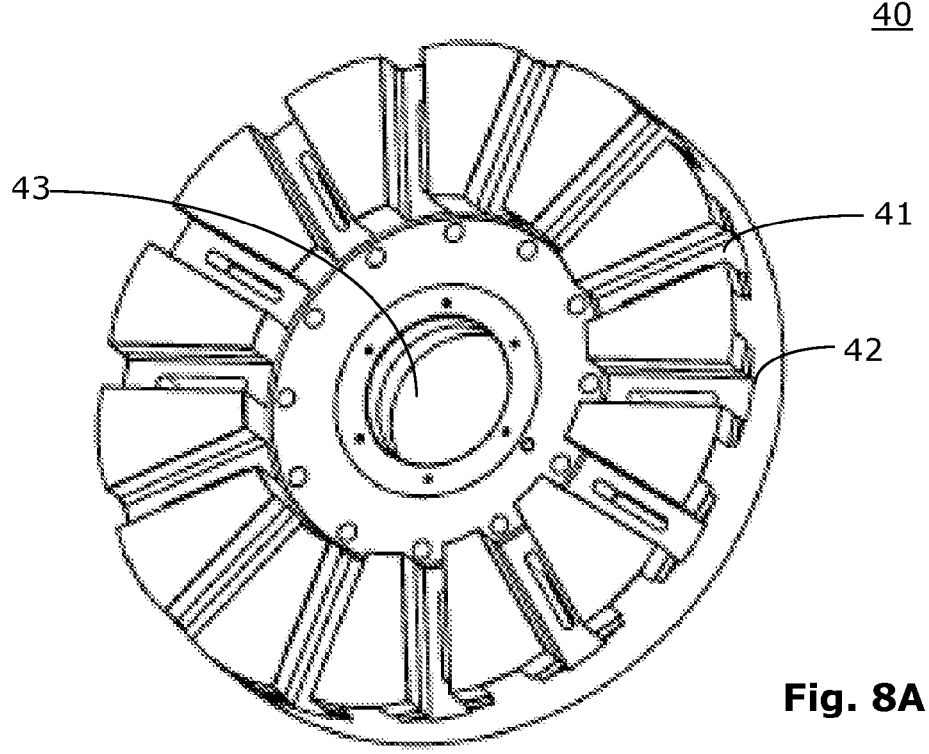
FIG. 8A is a perspective view of a 7-group cutter head in accordance with the invention for receiving several base holders with form blades.
Figure 8B:
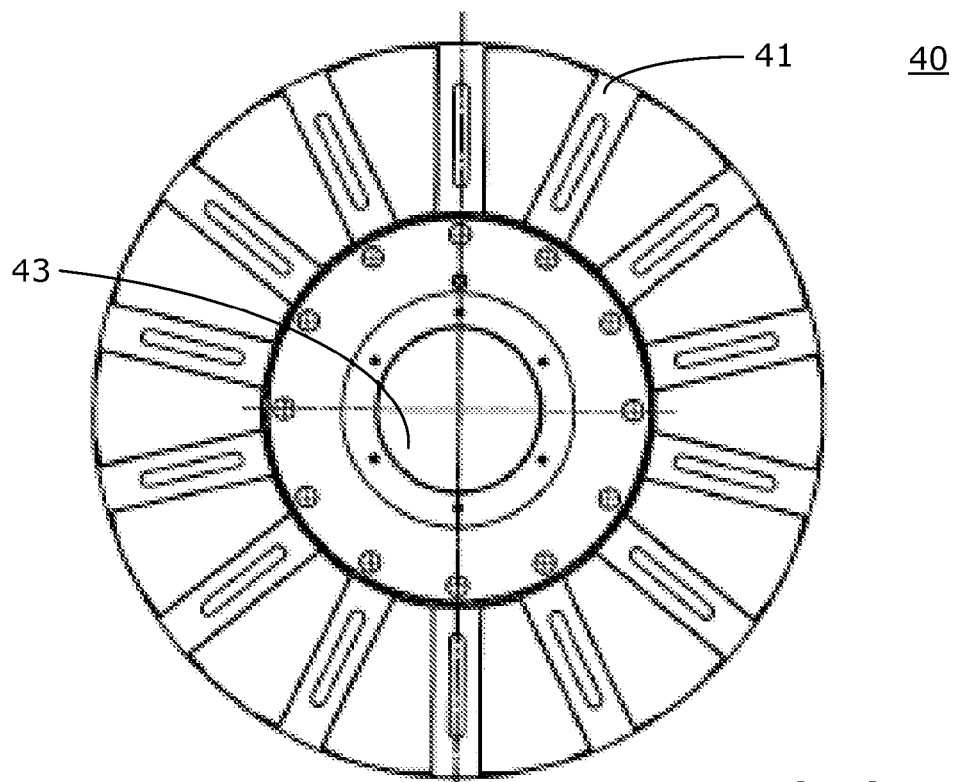
FIG. 8B is a top view of the cutter head in accordance with the invention according to FIG. 8A.

FIGS. 8A and 8B shows a first cutter head 40 which can accommodate seven groups of form blades 10. Each group comprises two form blades 10 in this case. Fourteen radially directed guide slots 41 are provided on the cutter head 40, which slots open into an outer cylindrical surface 42. The connecting areas 11.1 or 21.1 of the base body 11 or 21 can be inserted from the outer cylindrical surface 42 into the guide slots 41. The base bodies 11, 21 can be radially positioned and fastened in radially directed guide slots 41 individually and continuously.

Figure 9A:
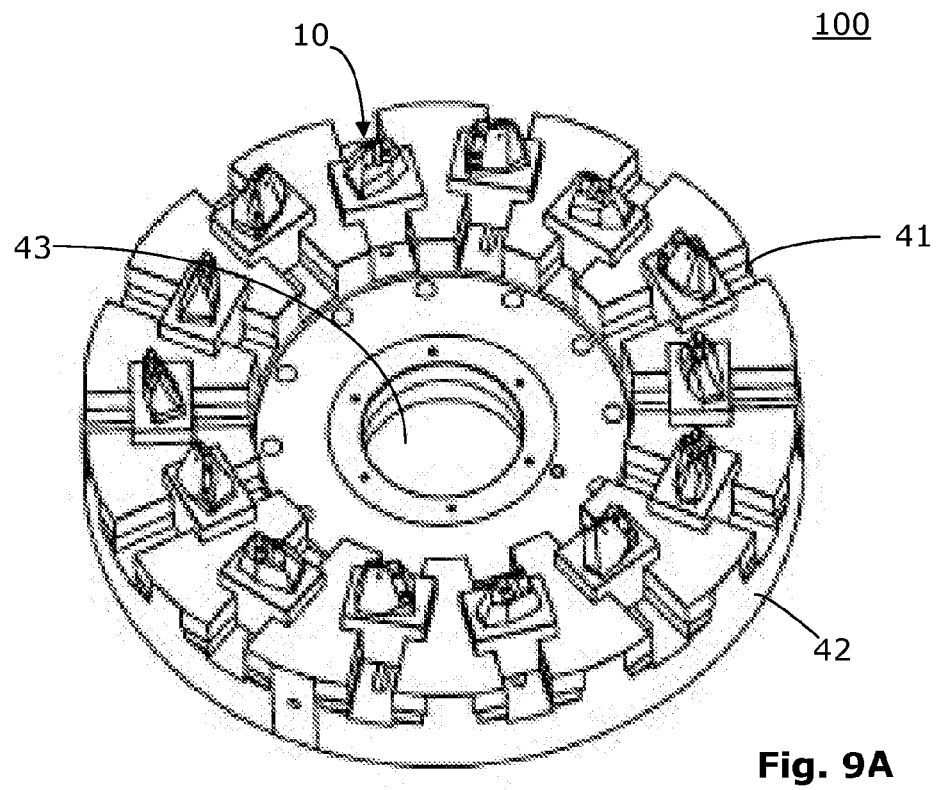
FIG. 9A is a perspective view of a 7-group cutter head in accordance with the invention for receiving several base holders with form blades.
Figure 9B:
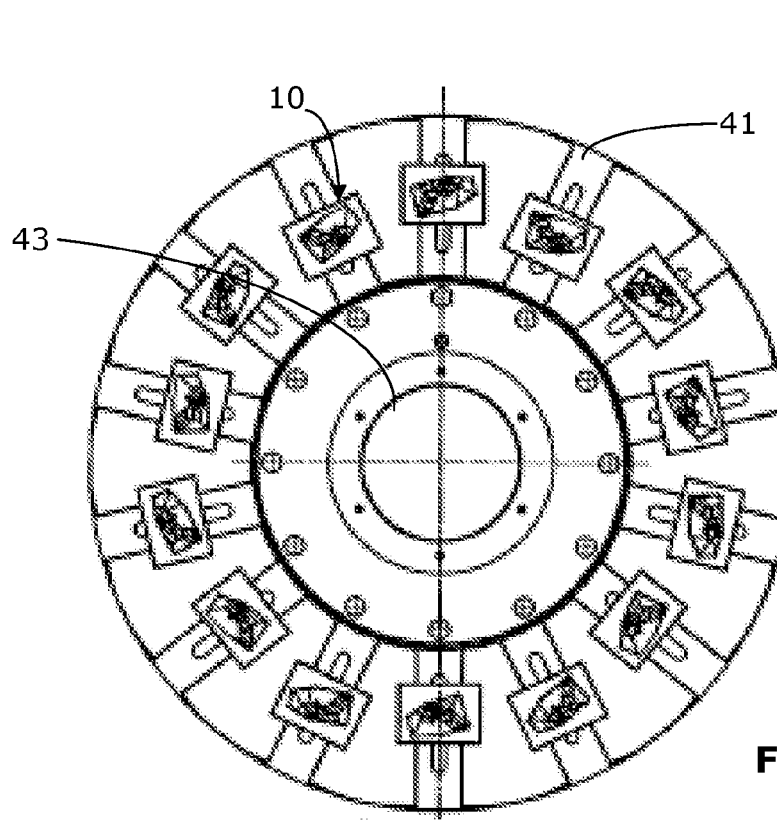
FIG. 9B is a top view of the cutter head in accordance with the invention according to FIG. 9A.

FIGS. 9A and 9B show a cutter head 40 according to the FIGS. 8A and 8B, with the cutter head being equipped completely with form blades 10. Each of the seven groups comprises an inside cutter and an outside cutter (for the inside and outside flanks of the tooth gaps to be produced). FIG. 7 shows a respective form blade 10 which is used as an inside cutter.

The drawings further show that the base body 11 can comprise a recess in the form of a round hole 9 for example (see FIGS. 3B, 3C, 4B, 4C, 5B, 5C, 6B, 6C, 7B, 7C, 7E) at the bottom end of the cutter bar(s) 13.1, 13.2, 13.3. This recess is used to receive a respective pointed edge of the respective cutter bar(s) 13.1, 13.2, 13.3. As a result of this measure, the precision of the receiving area 12.1, 12.2, 12.3 of the base body 11 needs to be less precise. The application of the respective recesses is optional.

A further optional feature is shown in the FIGS. 3C, 4C and 6C. It can be seen at the bottom end of cutter bar(s) 13.1, 13.2, 13.3 that the cutter bar(s) 13.1, 13.2, 13.3 and/or the support plate 17 may comprise a concave or backwardly offset rear side. These optional measures can ensure a better seat of the cutter bar(s) 13.1, 13.2, 13.3 on the base body 11. If the rear side is concave or backwardly offset, the respective cutter bar can no longer be turned or twisted in order to use other cutting edges.

The grinding quality and the geometric precision of the cutter bar(s) 13.1, 13.2, 13.3 are very important for the achievable production quality of the bevel gear workpiece.

The cutter bar(s) 13.1, 13.2, 13.3 in accordance with the invention are made of hard metal, as already mentioned. Cutter bar(s) 13.1, 13.2, 13.3 are especially preferable which are at least partly coated.

The cutter bar(s) 13.1, 13.2, 13.3 in accordance with the invention can also be made of high-speed steel (HSS).

The present tools 10 are especially suitable for soft machining or large-module bevel gears. The tools are also suitable for use in the car industry for example although bevel gears with smaller modules are typically used there.

The tool 10 in accordance with the invention is especially suitable for machining Zyklo-Palloid spiral bevel gears.

The present tools 10 can also be designed for dry machining of bevel gears.

The cutter bar(s) 13.1, 13.2, 13.3 are preferably made of hard metal in accordance with the invention and comprise at least one ground cutting edge 18.1 which converges from the main cutting blade into the head cutting blade.

Hard-metal cutter bars 13.1, 13.2, 13.3 in sintered configuration are especially preferred for soft machining.

The base bodies 11 and 21 are preferably made of hardened case-hardening steel in accordance with the invention.

The illustrated and described cutter heads 40 are characterized in that they can be equipped flexibly with the respective form blades 10 and one and the same cutter head 40 can be used for different module ranges as a result of the various possibilities for adjusting and setting. A standard tool system is provided which can be used very flexibly.

The invention provides a new tool system which can be used for soft and hard machining of gear wheels depending on the configuration of the base body and the cutter bars. Productivity can be increased noticeably with the tools 100. Moreover, the costs in comparison with other comparative solutions could be reduced considerably.

| Tool (form blade) for soft machining | 10 |
|---|---|

-continued

| | |
|---|---|
| Base body for soft machining | 11 |
| Connecting area | 11.1 |
| First receiving area | 12.1 |
| Second receiving area | 12.2 |
| First cutter bar | 13.1 |
| Second cutter bar | 13.2 |
| Third cutter bar | 13.3 |
| Free surface | 15 |
| Chip space | 16 |
| Fastening means (support plate) | 17 |
| Cutting edges | 18.1, 18.2, 18.3, 18.4, 18.5 |
| Screw | 19 |
| Tool for hard machining | 20 |
| Base body for hard machining | 21 |
| Clamping body for hard machining (connecting area) | 21.1 |
| Dovetail clamping system | 22 |
| Cutter head | 40 |
| Radially directed guide slots | 41 |
| Outer cylindrical surface | 42 |
| Tool spindle receiver | 43 |
| Tool | 100 |
| Tool spindle axis | A |
| Width | B |
| Thickness | D |
| Length | L |
| Cutting direction | S |
| Axis | R1 |
| Axis | R2 |
| Axis | R3 |

The invention claimed is:

1. A machine tool (100) comprising a cutter head (40) and several groups of forming (20) tools, with each forming tool having a base body (11; 21) with a first receiving area (12.1) for a first cutting body, a connecting area (11.1) for insertion in the cutter head (40) such that the base body (11; 21) extends from the cutter head (40) parallel to a tool spindle axis (A) of the cutter head (40), and a first cutting body, characterized by:
a first cutter bar (13.1) which serves as a first cutting body;
a second receiving area (12.2) on the base body (11; 21) for a second cutter bar (13.2);
a second cutter bar (13.2),
one base body (11; 21) for each pair of first cutter bar (13.1) and second cutter bar (13.2), and
a cavity serving as a chip space (16),
wherein the first receiving area (12.1) and the second receiving area (12.2) are positioned on the base body (11; 21), and the connecting area (11.1) is inserted into the cutter head (40), in such a way that the first cutter bar (13.1) and the second cutter bar (13.2) are arranged to be circumferentially offset with respect to one another on the same base body (11; 21), and with the chip space (16) being disposed on the base body (11; 21) in a region between the first cutter bar (13.1) and the second cutter bar (13.2).

2. A machine tool (100) according to claim 1, characterized in that the base body (11; 21) comprises steel, preferably soft steel, and the cutter bars (13.1 to 13.3) comprise high-speed steel (HSS) or hard metal (HM).

3. A machine tool (100) according to claim 1, characterized in that the receiving areas (12.1, 12.2) each comprise a supporting surface, a stop surface and fastening means (17; 19).

4. A machine tool (100) according to claim 1, characterized in that the cutter bars (13.1 to 13.3) are arranged to be twistable and comprise at least two cutting edges (18.1, 18.2).

5. A machine tool (100) according to claim 4, characterized in that the cutter bars (13.1 to 13.3) comprise four cutting edges (18.1 to 18.4) and preferably have a rectangular basic shape.

6. A machine tool (100) according to claim 1, characterized in that the first cutter bar (13.1) is longer than the second cutter bar (13.2), with the first cutter bar (13.1) being arranged on the base body (11; 21) before the second cutter bar (13.2) when seen in the cutting direction (S) and providing a primary cutter (18.1), whereas the second cutter bar (13.2) provides a secondary cutter (18.5).

7. A machine tool (100) according to claim 1, characterized in that radially directed guide slots (41) are present on the cutter head (40) which open into an outside cylindrical surface (42), with the connecting areas (11.1; 21.1) of the base body (11; 21) being insertable into the guide slots (41) from the outside cylindrical surface (42).

8. A machine tool (100) according to claim 1, characterized in that the cutter bar (13.1 to 13.3) comprises a first cutting edge (18.1) which is used as a primary cutter and a second cutting edge which is used as a head cutter.

9. A machine tool (100) according to claim 1, characterized in that the base body (11; 21) comprises a relief face (15) and the first cutter bar (13.1) is arranged in the region of the relief face (15).

10. Use of a machine tool (100) according to claim 1, for soft machining a gear wheel blank, preferably a bevel gear blank, with the tool (100) being used as a form blade and the cutter bars (13.1, 13.2, 13.3) comprising hard metal (HM).

11. The use according to claim 10, characterized in that a bevel gear blank is concerned for producing a large-module bevel gear.

12. The use according to claim 10, characterized in that the form blade is relief-ground or undercut.

13. The use of a machine tool (100) according to claim 1 for hard machining a gear wheel, preferably a bevel gear, after a hardening process, wherein the cutter bars (13.1, 13.2, 13.3) comprise high-speed steel (HSS) and are preferably CBN-coated.

* * * * *